United States Patent
La Pierre

[19]

[11] Patent Number: 5,951,611
[45] Date of Patent: Sep. 14, 1999

[54] DIAGNOSTIC TREND ANALYSIS

[75] Inventor: Lee R. La Pierre, Woburn, Mass.

[73] Assignee: General Electric Company, Cincinnati, Ohio

[21] Appl. No.: 08/748,745

[22] Filed: Nov. 18, 1996

[51] Int. Cl.$^6$ ................................................. B60G 17/08
[52] U.S. Cl. ............................................ 701/29; 364/576
[58] Field of Search ................................ 701/29; 364/576

[56] References Cited

U.S. PATENT DOCUMENTS 5,586,066  12/1996  White et al. ............................. 364/576

FOREIGN PATENT DOCUMENTS 2291199   1/1996  United Kingdom .
96/00943  1/1996  WIPO .
WO
96/000943 1/1996  WIPO .

Primary Examiner—Willliam A. Cuchlinski, Jr.
Assistant Examiner—Olga Hernandez
Attorney, Agent, or Firm—Andrew C. Hess; Rodney M. Young

[57] ABSTRACT

A diagnostic trend analysis method is used to analyze engine trend data for aircraft engines. Appropriate trend parameters are calculated from raw trend data and wild points associated with the calculated trend parameters are eliminated. Abnormal shifts and changes are detected at the most recent point for each trend parameter. The abnormal shifts and changes in each trend parameter are then evaluated. The evaluation is used to filter out spurious symptoms and provide accurate maintenance recommendations for real engine trend shifts.

6 Claims, 4 Drawing Sheets

FIG. 3A

| DISCREPANCY | | 1 T5@NL | 2 WF@NL | 3 P3@NL | 4 P5@NL | 5 NH@NL | 6 WFP3@NL | 7 P3@T5 | 8 P5@T5 | 9 WFP3@T5 | 10 NH@T5 |
|---|---|---|---|---|---|---|---|---|---|---|---|
| P3 SHIFT | LOW | ▶▶▶ | | ▶▶ | | | ◀ | ▶▶ | | ◀ | |
| | LOW | ▶▶ | | | | | ▶ | ◀◀ | | ◀ | |
| | HIGH | ◀◀ | | ◀◀ | | | | | | ◀ | |
| | HIGH | | | | | | | | | ▶ | |
| T5 SHIFT | LOW | | | | | | | | ◀ | | ◀◀ |
| | LOW | | | | | | | | ▶ | | ▶▶ |
| | LOW | | | | | | | | | | ▶◀ |
| | HIGH | | | | | | | | | | |
| | HIGH | | ▶◀ | | ▶◀ | | | | | | |
| | HIGH | | | | | | | | | | |
| P5 SHIFT | LOW | | | | | | | | | | |
| | HIGH | | | | | | | | | | |
| WF SHIFT | LOW | | | | | ▶◀ | ▶◀ | | | ▶◀ | ▶◀ |
| | HIGH | | | | | | | | | | |
| VG SHIFT | OPEN | | | | | | | | | | |
| | CLOSED | | | | | | | | | | |

FIG. 3B

DIAGNOSTIC TREND ANALYSIS

TECHNICAL FIELD

The present invention relates, in general to jet aircraft engines and, more particularly, to a process for analyzing engine trend data to evaluate overall engine performance.

BACKGROUND OF THE INVENTION

Current engine trend data analysis techniques used by commercial airlines and the military rely, in general, on visual examination of trend data to detect symptoms indicative of the need for inspection or maintenance. This approach is labor intensive, and requires considerable experience in order to identify real trend changes from "rogue" data and sensor shifts. Consequently, much of the value of trending can be lost unless a user is dedicated to frequent detailed analysis of engine trend data. While large commercial airlines are dedicated to trend monitoring, smaller airlines and other commercial operators, as well as the United States military, do not take full advantage of trend monitoring because of dedication required to analyzing data as well as the uncertainty in how to interpret trend symptoms for maintenance.

In the existing art, the United States Air Force utilizes a statistical analysis technique to perform automatic detection of trend shifts by computation of a slope with a threshold in order to trigger an "alarm". Although this method of trend detection works well, in some cases small changes may be missed or may take several fights before the trend change can be identified. This, of course, delays detection of a potentially critical situation. In addition, this technique is not able to discern scatter and sensor drift\shift from real engine changes. Consequently, considerable experience is still required to interpret detected symptoms. This has resulted in diminished use of the trend information as a maintenance driver.

It would be desirable, then, to have an engine trend data analysis technique which provides increased efficiency in detecting anomalous trends, and which is also less labor intensive. The objects, features and advantages of the present invention will become more readily apparent in the following description when taken in conjunction with the appended drawings.

SUMMARY OF THE INVENTION

The present invention provides for a diagnostic trend analysis for analyzing engine trend data to evaluate overall engine performance and gas path health. The diagnostic trend analysis process of the present invention automatically detects changes in trend parameters. When viable symptoms are detected, specific maintenance recommendations are generated without requiring visual examination of data. The technique according to the present invention enables a high degree of automation and accuracy, as compared with trend analysis methods currently in use.

Briefly, in accordance with one aspect of the present invention, a diagnostic trend analysis method is provided for analyzing engine trend data of aircraft engines. Initially, appropriate trend parameters are calculated from raw trend data. Wild or rogue points are eliminated, so as not to be included in the detection analysis process. Abnormal shifts and changes are detected at the most recent point for each trend parameter. The changes in all available trend parameters are then evaluated, according to predetermined relationships, in order to filter out spurious data and provide accurate maintenance recommendations for real engine trend shifts.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

FIGS. 3A and 3B illustrate a sample fault template for trend event detection and analysis.

DETAILED DESCRIPTION OF THE INVENTION

Diagnostic trend analysis, in accordance with the present invention, is similar to many engine trend analysis techniques in that it relies on the computation of trend parameters which are referenced to some type of parametric baseline. The parametric baseline is generally empirically derived or generated with an engine cycle model. The diagnostic trend analysis method according to the present invention utilizes multiple trend parameters in order to perform the parametric filtering methodology. Each trend parameter used is an indicator of overall engine performance or gas path health. The steps for calculation of the trend parameters, which are in general used throughout the industry, are outlined below.

Figure 1:
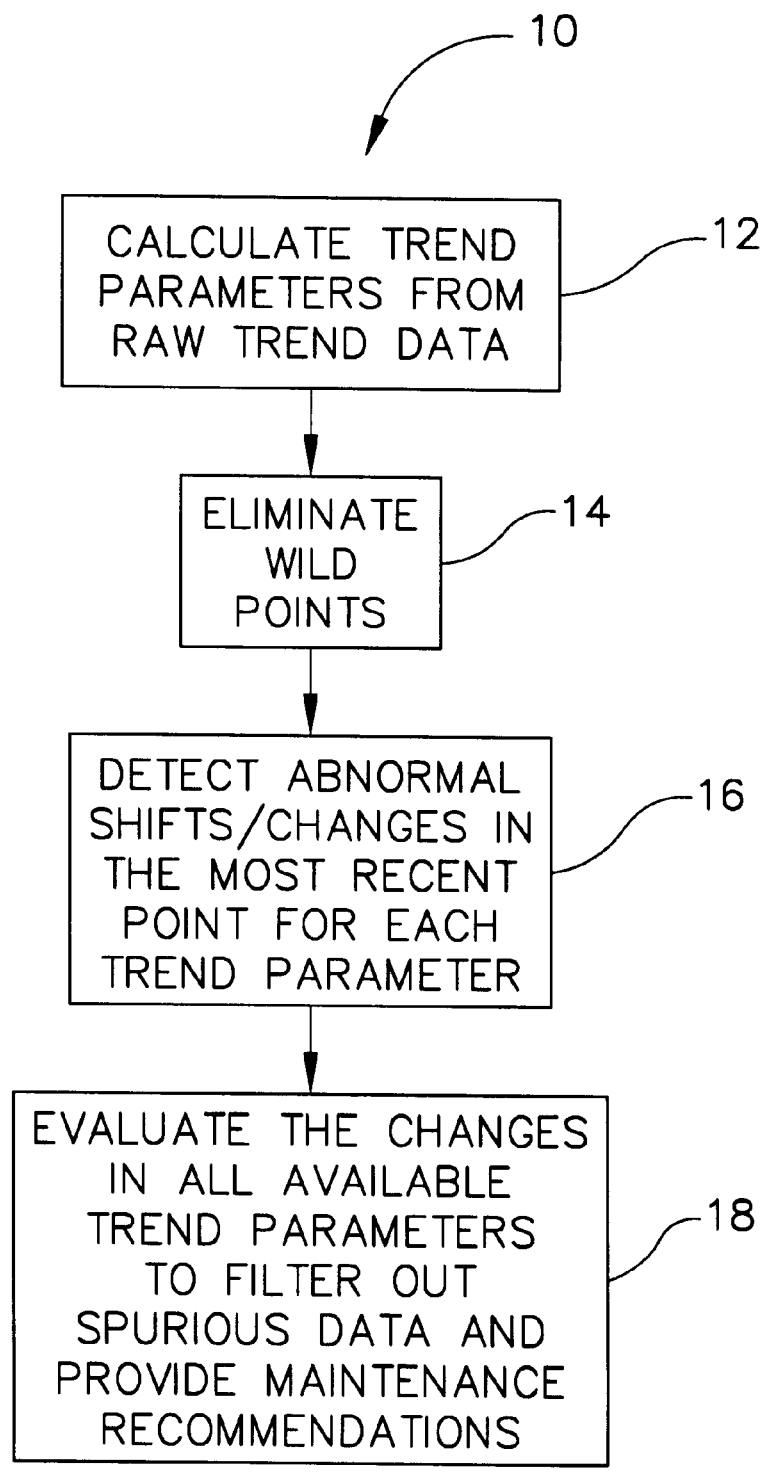
FIG. 1 is a flow chart illustrating the steps employed by the diagnostic trend analysis method, in accordance with the present invention.

Referring to the drawings, FIG. 1 is a flow chart 10 illustrating the steps employed by the diagnostic trend analysis method of the present invention. At block 12, appropriate trend parameters are calculated from raw trend data. Block 14 allows for the elimination of wild or rogue points, so those points are not included in the detection analysis process. At block 16, abnormal shifts and changes are detected at the most recent point for each trend parameter from block 12, as modified by block 14. Finally, at block 18, the changes in all available trend parameters are evaluated, according to predetermined relationships, in order to filter out spurious data and provide accurate maintenance recommendations for real engine trend shifts.

Figure 2:
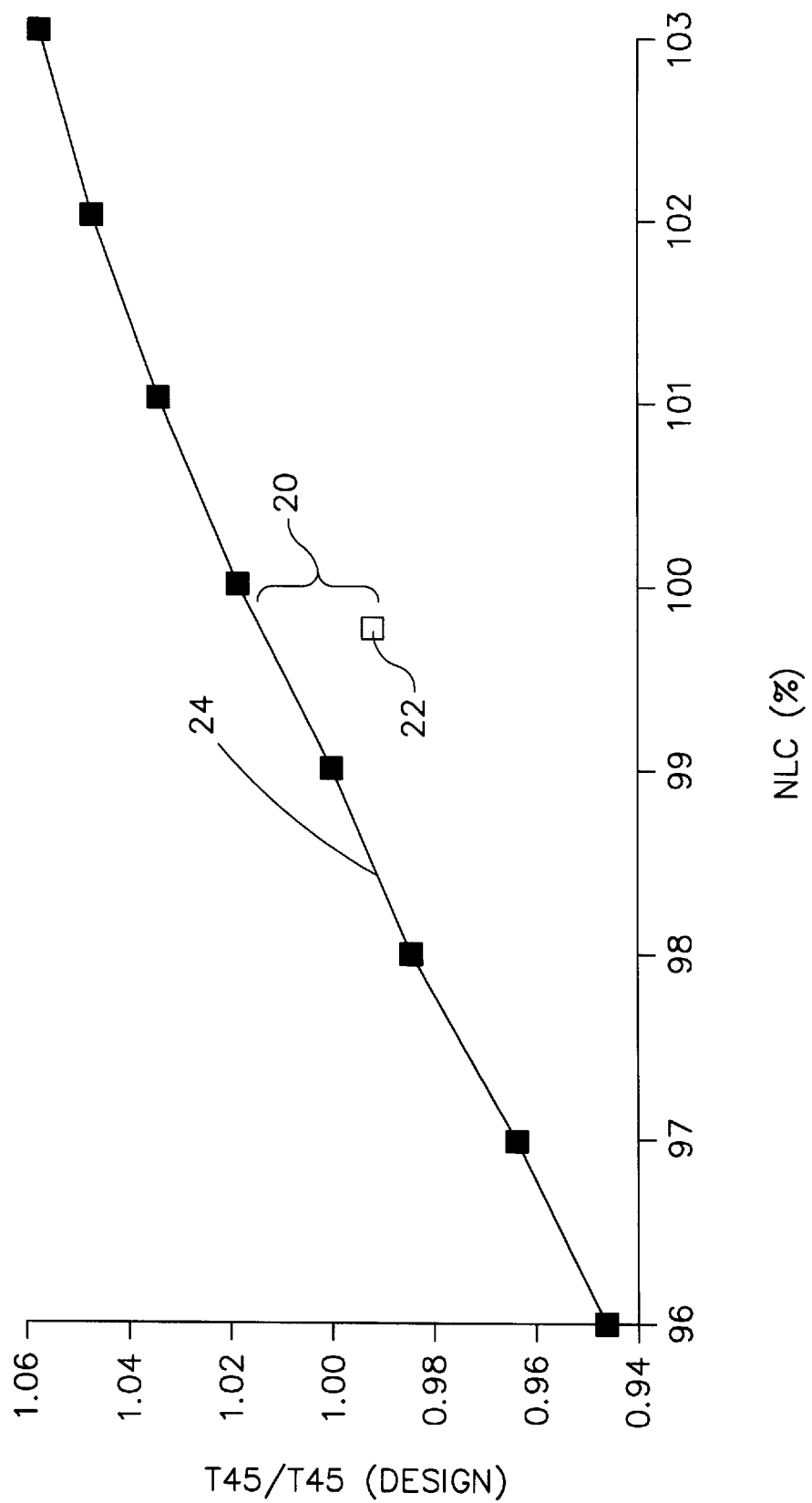
FIG. 2 is a graphical illustration of trend parameter calculations.

Continuing with FIG. 1 and referring now to FIG. 2, to calculate trend parameters, a "corrected" or "referred" value is computed for each raw parameter used for trending. The trend parameters are then calculated using the corrected parameters and parametric baselines, typically determined using an engine performance simulation. FIG. 2 illustrates the trend parameter calculation.

In FIG. 2, the x-axis (NLC) is representative of a corrected or referred value of the rotational speed of the engine's fan and low pressure turbine rotor, and is a percent value. The y-axis is represented by T45, i.e., the temperature at engine station 4.5, which is the high pressure turbine exit plane of the engine, and T45(design), i.e., a design value of the same temperature. Therefore, the y-axis is the ratio of the high pressure turbine exhaust gas temperature, and a design value of the exhaust gas temperature, which is a fixed number. The trend parameter, indicated as a trend delta 20 in FIG. 2, is determined by subtracting the T45/T45(design) value of the actual trend point 22 from the T45/T45(design) value on the baseline 24 at the same NLC as the actual trend point 22. Although the trend parameters available for use are dependent on available instrumentation, examples of suitable trend parameters include a change in exhaust gas temperature at a given fan speed (▲T5@NL), a change in main engine fuel flow at a given fan speed (▲WF@NL), a change in main engine fuel flow at a given exhaust gas temperature (▲WF@T5), a change in compressor rotor speed at a given fan speed (▲NH@NL), a change in the compressor discharge pressure at a given compressor rotor speed (▲PS3@NH), a change in exhaust gas temperature at a given compressor rotor speed (▲T5@NH), a change in the ratio of main engine fuel flow to compressor discharge pressure at a given exhaust gas temperature (▲WF/PS3@T5), a change in turbine exhaust pressure at a given exhaust gas temperature (▲PT5@T5), etc. It will be obvious to those skilled in the art that although FIG. 2 illustrates how the particular trend parameter calculation for ▲T5@NL would be determined, the same analysis can be applied to a determination of other trend parameters.

Another objective in the selection of trend parameters is to provide at least two trend parameters which utilize each of the available raw trend parameters. Hence, if, for example, PS3 is available, then PS3@NH and PS3@T5 might be used. This permits isolation of the PS3 sensor drift/shift from real performance changes. Another consideration in selecting trend parameters is to choose parameters that are reasonably sensitive to overall or gas path performance changes. This is most easily evaluated by cycle model analysis, i.e., a known computer program that models the behavior of the engine. The cycle model could be used to determine which parameters, such as temperatures, pressures, etc., inside the engine would be most sensitive to changes in the "health" of the engine and, thus, most useful for trend analysis. If the selected trend parameters enable differentiation between high and low pressure gas path performance, this technique can provide some limited module performance fault isolation, where the term module is referring to the different parts of the engine through which the air and hot gases pass. Any one of the modules may become damaged and cause the performance of the engine to decline, so even limited information about which engine module or modules may be the cause of poor performance is helpful.

Prior art engine trend data analysis techniques require considerable experience in order to distinguish between true trend changes and "rogue" data and sensor shifts. While the present invention provides a diagnostic trend analysis capable of automatically detecting changes in trend parameters, trend changes are not relayed to maintenance personnel unless corresponding changes are seen in related parameters. Consequently, only viable symptoms are provided. When viable symptoms are detected, specific maintenance recommendations are generated without requiring visual examination of data. The technique of the present invention, therefore, enables a high degree of automation and accuracy, compared to currently practiced trend analysis methods.

As shown in block 14 of FIG. 1, the present invention allows for the identification of wild points. Wild or rogue points may be identified using, for example, the same statistical methodology used to identify step changes in the trend data. Wild point elimination is known in the art and is performed by excluding all data points from the detection calculation that are outside a predetermined tolerance band for a given sample of data for the statistical analysis technique used. As will be known to those skilled in the art, there are many standard statistical techniques for evaluating a population of data. For example, a standard deviation technique can be used to measure the scatter in a sample of data around the average for the population of data. A wild point can be determined by defining it as any point that is more than some number of standard deviations from the average. It is important that the wild point elimination methodology does not eliminate shifts that are caused by real engine performance changes.

At block 16 of FIG. 1, detection of abnormal shifts or changes in trended data is performed. This detection is preferably performed using a known statistical "control chart" method, which identifies "special cause" variations in time ordered data. This approach is somewhat more sensitive to "deviations" in trends than a +/−3σ, i.e., standard deviation, approach. However, even with this refinement, experience indicates that the separation of scatter from real performance changes requires considerable judgment. For this reason, the parametric filtering process is implemented to prevent false "hits" and single parameter fluctuations from overwhelming a user with numerous trend alarms.

As used for the diagnostic trend analysis, in accordance with the present invention, the control chart method is preferably applied as follows. Initially, a sample comprising fifteen of the most recent trend points, excluding any wild points, is used. An arithmetic mean for the sample of fifteen is calculated for each trend parameter, according to the following equation:

$$X_{avg} = \frac{x1 + x2 + x3 + \ldots + x15}{15}$$

The average "distance" between consecutive points is then calculated for each parameter, such as according to the following equation:

$$R_{avg} = \frac{|x1 - x2| + |x2 - x3| + |x3 - x4| + \ldots + |x14 - x15|}{14}$$

An upper and lower control limit can then be calculated for each parameter, such as according to the following equations:

UCL=$X_{avg}$+2.66R avg and

LCL 32 $X_{avg}$−2.66R avg

For each trend parameter, it is determined if the latest, i.e., most recent, point in the trend sample is greater than the upper control limit (UCL) or lower than the lower control limit (LCL). A flag can be set for each parameter which exceeds either of these limits. The flag should also include an indication of which limit, upper or lower, was exceeded. The flags are used to perform parametric filtering for the diagnostic trend analysis method of the present invention.

Continuing with FIG. 1, at block 18, all detected shifts, occurring at a single point in time, i.e. at the same trend point, are analyzed using a parametric filtering technique. If only a single parameter is flagged out of range, the event is consider spurious and no maintenance message is generated. If more than one parameter shifts at a single point in time, the specific parameters and their direction of change are compared to a "fault template" to determine if the shift in the trend data is characteristic of a known or recognizable cause. If the pattern matches a known cause, then a trend alarm can be generated along with its corresponding maintenance recommendation, Alternatively, an explanation of why the shift occurred is given. The general categories for recognizable shifts include, for example, (1) sensor drift or shift, or (2) real performance changes, which includes gas path performance deterioration, excessive leakage, variable geometry (VG) schedule changes, etc. Further breakdown of real performance changes may be possible by identifying low pressure versus high pressure module performance changes if the selected trend parameters enable this degree of resolution. If more than one parameter shifts, but the pattern is not recognized (i.e. not in the fault template), the event may be placed on a maintenance "watch list" or ignored until discernable symptoms occur.

Figure 3A:
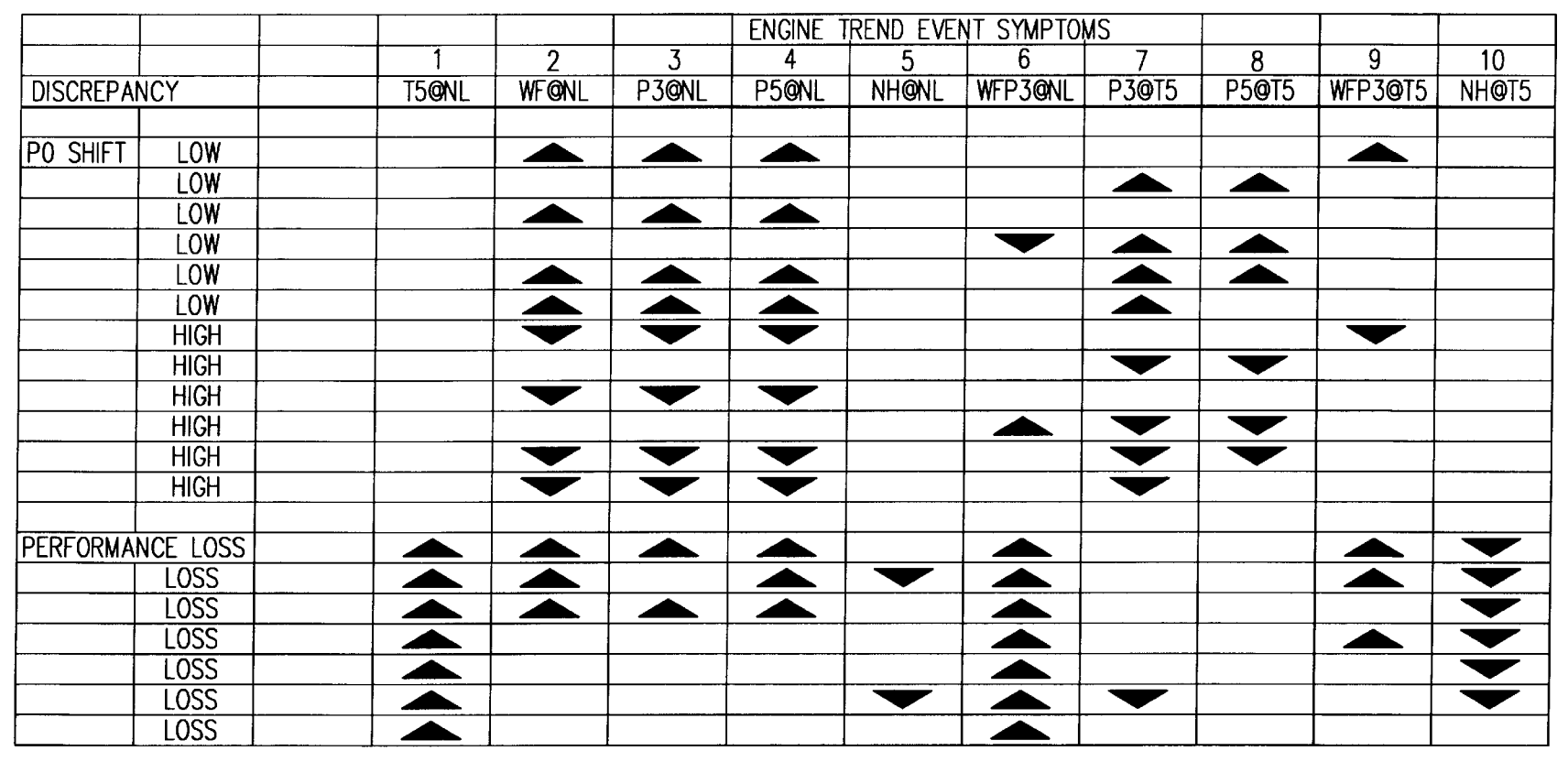

FIGS. 3A and 3B illustrate an example of a trend fault template for generation of trend alarms and their corresponding maintenance recommendations. On the left side of the template are the engine discrepancies correlating to the various trend event symptoms, including pressure and temperature shifts, performance losses, main engine fuel flow shift, variable geometry shift, etc. In a preferred embodiment of the present invention, the actual trend signature, indicating which shifts are up or down, is compared to the fault template of FIGS. 3A and 3B. The resultant set of symptoms is then "scored" against all possible causes, by applying varying degrees of importance to the match between template symptoms and actual symptoms. Rarely would all of the symptoms be set for a given fault, therefore the scoring methodology provides a means of evaluating the most likely cause from actual symptoms. The specific trend parameters used in the trend template for a given engine should be evaluated empirically, since cycle model predicted sensitivities do not always reflect real engine parametric response to changes in engine component performance. However, the initial template generation for a new engine must necessarily be based on a cycle model analysis or similarity to an existing engine.

The present invention, therefore, provides for a diagnostic trend analysis method for analyzing engine trend data and evaluating overall engine performance and gas path health. The diagnostic trend analysis method according to the present invention provides reliable detection and annunciation of only those changes and shifts in trend data that merit attention by maintenance, and suppresses false or spurious shifts in trend data. Abnormal trend detection and analysis can be fully automated, in accordance with the present invention. Furthermore, specific maintenance recommendations accompany each trend event that merits attention.

In accordance with the present invention, fault templates or parametric filtering is implemented to detect meaningful shifts in trend data and to interpret those changes into maintenance recommendations. Furthermore, multiple trend parameters are used to enhance classification of detected trend shifts into random or spurious events, sensor or signal shifts, or real engine performance changes. Control chart methodology is utilized for detecting shifts in trend data, thereby providing enhanced sensitivity in the detection of changes.

While preferred embodiments of the present invention have been shown and described herein, it will be obvious to those skilled in the art that such embodiments are provided by way of example only. Numerous variations, changes, and substitutions will now occur to those skilled in the art without departing from the invention. For example, the control chart approach may be replaced with any statistical method which checks for variation beyond a certain value from the mean. The method of the present invention also lends itself to detection techniques such as those which check for the time ordered slope of trend data to exceed a threshold. Additionally, besides flagging a trend alarm based solely on a recognizable pattern of shifts in two or more trend parameters, the magnitude of changes in one or more of those parameters could also be included as a factor in alarm generation. A natural variation of the method also occurs for each set of trend parameters used, resulting in a new fault template. Also, in addition to using parameters that are sensitive to engine\module performance, mechanical parameters, such as engine vibrations, and lubrication system parameters can also be trended using the diagnostic trend analysis method of the present invention. Engine core/fan vibrations can be trended with performance parameters to provide detection/isolation of damage to the engine gas path. Accordingly, it is intended that the invention be limited only by the spirit and scope of the appended claims.

I claim:

1. A diagnostic trend analysis method for analyzing engine trend data for aircraft engines, the method comprising the steps of:

calculating appropriate trend parameters from raw trend data;

eliminating wild points associated with the calculated trend parameters;

detecting abnormal shifts and changes at a most recent point for each trend parameter and differentiating between a real change in engine performance and a faulty measurement or data scatter;

evaluating the abnormal shifts and changes in each trend parameter; and using the evaluation to filter out spurious data and provide accurate maintenance recommendations for real engine trend shifts.

2. A diagnostic trend analysis method as claimed in claim 1 further comprising the step of calculating corrected parameters to determine actual trend parameters.

3. A diagnostic trend analysis method as claimed in claim 1 further comprising the step of generating a fault template indicative of abnormal shifts and corresponding maintenance recommendations.

4. A diagnostic trend analysis method as claimed in claim 3 further comprising the step of comparing a set of actual trend symptoms to the fault template to identify a possible cause for each of the actual trend symptoms.

5. A diagnostic trend analysis method as claimed in claim 4 further comprising the step of evaluating the match between the set of actual trend symptoms and the fault template.

6. A diagnostic trend analysis method as claimed in claim 5 wherein the step of evaluating the match further comprises the step of scoring proximity of actual trend parameter shifts to each set of shifts in the fault template.

* * * * *